United States Patent [19]

Taig

[11] Patent Number: 4,865,165

[45] Date of Patent: Sep. 12, 1989

[54] ELECTRICALLY ACTUATED CABLE

[75] Inventor: Alistair G. Taig, Edwardsburg, Mich.

[73] Assignee: Allied-Signal Inc., Morristown, N.J.

[21] Appl. No.: 253,277

[22] Filed: Oct. 4, 1988

[51] Int. Cl.[4] .............................................. F16D 65/34
[52] U.S. Cl. .................................. 188/156; 74/89.15;
188/2 D; 188/162
[58] Field of Search ................. 74/89.15, 424.8, 500.5;
188/2 D, 106 A, 106 R, 156, 157, 158, 162

[56] References Cited

U.S. PATENT DOCUMENTS

| | | |
|---|---|---|
| 3,036,668 | 5/1962 | Falk et al. ...................... 188/2 D X |
| 4,175,646 | 11/1979 | Eikelberger ......................... 188/156 |
| 4,381,049 | 4/1983 | Crossman ........................... 188/72.7 |
| 4,456,101 | 6/1984 | Yamamoto et al. ......... 188/196 BA |
| 4,491,203 | 1/1985 | Monick ............................. 188/71.9 |
| 4,570,506 | 2/1986 | Yamamoto et al. ........... 74/501.5 R |
| 4,596,316 | 6/1986 | Crossman ........................... 188/72.1 |

FOREIGN PATENT DOCUMENTS 609311  9/1960  Italy .................................... 188/162

Primary Examiner—Duane A. Reger
Attorney, Agent, or Firm—Larry J. Palguta; Ken C. Decker

[57] ABSTRACT

The electrically actuated cable mechanism (10) comprises a housing (12) disposed about the cable (15) and having a movable conduit (20) extending from one end and a stationary conduit (30) extending from the other end, each conduit (20, 30) being disposed about the cable (15). Located between the conduits (20, 30) and engaging the movable conduit (20) is a hollow screw (25) which is disposed about the cable (15). The hollow screw (25) has a non-circular end (27) received in a complementary shaped opening (18) of the housing (12) in order to prevent rotation of the hollow screw (25). An electric motor (40) drives rotatably a nut (35) which engages threads of the screw (25) so that rotation of the nut (35) by the motor (40) causes axial displacement of the hollow screw (25) and a corresponding displacement of the movable conduit (20) relative to the stationary conduit (30) and housing (12), which by reaction, causes the cable (15) to be displaced. The cable (15) may be attached to parking brake mechanisms of a vehicle.

10 Claims, 1 Drawing Sheet

ELECTRICALLY ACTUATED CABLE

The present invention relates generally to an electrically actuated cable, and in particular to a cable that is actuated by expanding the cable conduit.

Almost all vehicles have a parking brake mechanism, and most of these vehicles have a hand lever for actuating the parking brake mechanism. Typically, the hand lever is attached to a cable and causes displacement of the cable and operation of the attached parking brake mechanism. It is desirable to provide an electrically actuated cable mechanism which operates reliably with a minimum number of parts, and has a low cost so that manual lever-actuated mechanisms may be replaced. Rather than having the cable displaced directly by a motor or lever, it is also desirable to cause displacement of the cable indirectly by causing a displacement or lengthening of the conduit.

The present invention comprises a cable about which is disposed a movable conduit and a stationary conduit, hollow screw means disposed about the cable and located between the conduits, the hollow screw engaging the movable conduit and the screw prevented from rotating by housing means, and motor means for effecting axial displacement of said hollow screw, operation of said motor means causing axial displacement of said hollow screw which causes said movable conduit to be displaced relative to the housing means and causing said cable, by reaction, to be displaced along with the movable conduit and effect displacement of ends of the cable.

One way of carrying out the invention is described in detail below with reference to the drawings which illustrate an embodiment in which.

Figure 1:
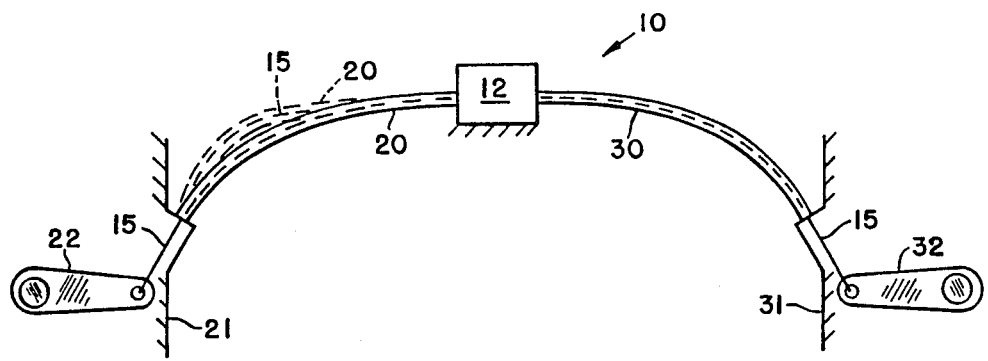
FIG. 1 is a schematic illustration of an electrically actuated parking brake mechanism in accordance with the invention.

The electrically actuated cable mechanism is designated generally by reference numeral 10 in FIG. 1. FIG. 1 illustrates schematically how electrically actuated cable mechanism 10 would be utilized in conjunction with parking brake mechanisms for a vehicle. The mechanism 10 includes a movable conduit 20 and a stationary conduit 30. Movable conduit 20 is attached to a backing plate 21 and an internal cable 15 is attached to a lever 22 of a parking brake mechanism for the wheel brake (not illustrated). Stationary conduit 30 is connected with the housing 12 of mechanism 10 and with a backing Plate 31 of an associated wheel brake and parking brake mechanism (not shown). The cable 15 extends through housing 12 and conduits 20 and 30 to attach at each end to the parking brake levers 22 and 32. When electrically actuated cable mechanism 10 is operated, movable conduit 20 is displaced relative to stationary conduit 30 and housing 12 so that conduit 20 assumes the dashed line position illustrated in FIG. 1. The cable 15, by reaction, is displaced with movable conduit 20 and correspondingly the ends of cable 15 are displaced so that levers 22 and 32 are rotated and the respective parking brake mechanisms actuated. Thus, mechanism 10 provides a displaceable cable mechanism that expands cable 15.

Figure 2:
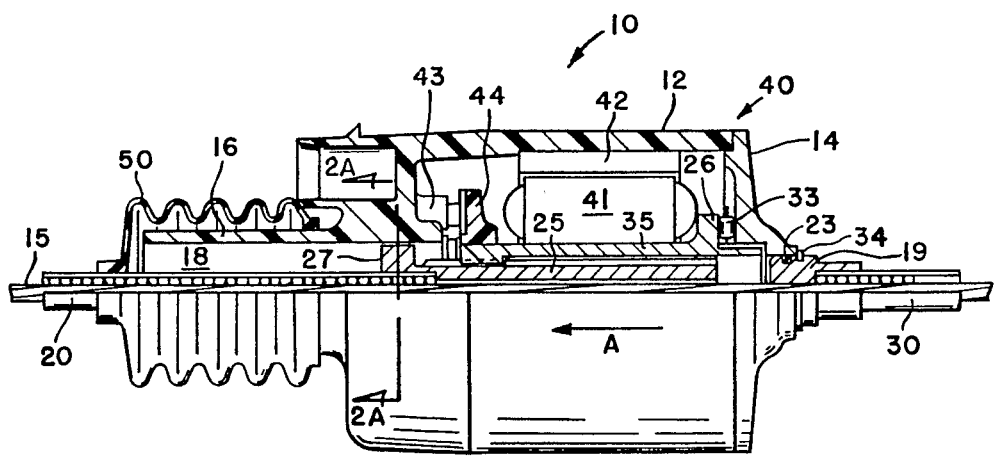
FIG. 2 is a section view of the electrical actuator of the present invention.
Figure 2A:
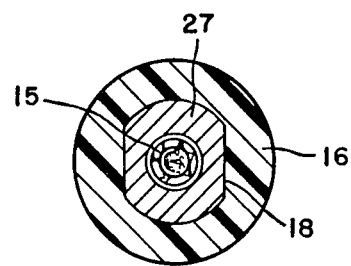
FIG. 2A is a sectional view taken from lines 2A—2A of FIG. 2.

FIG. 2 illustrates in detail the electrically actuated cable mechanism 10. Mechanism 10 comprises a housing 12 which includes a cover 14 and a housing extension 16. Housing extension 16 defines a non-circular opening 18. Cable 15 extends through housing 12, with the movable conduit 20 located at one end of housing 12 and the stationary conduit 30 located at the other end of housing 12. Stationary conduit 30 engages abuttingly a housing fitting 19, while movable conduit 20 extends into non-circular opening 18 and engages a hollow screw 25 which is disposed about cable 15. Hollow screw 25 includes a non-circular head portion 27 which is received slidingly within non-circular opening 18 so that screw 25 cannot rotate (see FIG. 2A). Disposed about hollow screw 25 and engaging the threads thereof is a nut 35 which is caused to rotate by a rotor 41 of motor 40. Motor 40 includes a magnet 42, brushes 43, and commutator 44. Hollow screw 25 includes a thrust flange 26 which engages thrust bearings 33 that engage cover 14 of housing 12. Fitting 19 includes an exterior seal 23 and a clip 34. Disposed about housing extension 16 and engaging movable conduit 20 is a flexible boot 50. Boot 50 and seal 23 prevent the entry of contaminants into housing 12.

The electrically actuated cable mechanism of the present invention operates to effect displacement of movable conduit 20 and cable 15. When the vehicle operator wishes to actuate the parking brake of the vehicle, he may activate a switch which causes energization of motor 40. Motor 40 effects rotation of nut 35 which, because hollow screw 25 cannot rotate, causes axial displacement of hollow screw in the direction of arrow A. As hollow screw 25 is displaced axially, it displaces a corresponding amount the movable conduit 20 so that conduit 20 is displaced relative to stationary conduit 30 and housing 12. Conduit 20 expands outwardly to the dashed line position illustrated in FIG. 1, and causes, by reaction, the ends of cable 15 to be displaced. Displacement of the ends of cable 15 causes the parking brake mechanisms to be actuated either by rotation of the respective levers 22 and 32 or by any other mechanism which may be actuated by displacement of the cable. When the vehicle operator wishes to disengage the parking brake of the vehicle, the operator actuates the switch which causes motor 40 to rotate the nut reversely and cause hollow screw 25 to be displaced axially in a direction opposite the direction of Arrow A. The tension within expanded conduit 20 causes conduit 20 to follow hollow screw 25 and resume the at-rest position illustrated in FIG. 1. Typically, the parking brake mechanisms (not illustrated) include springs or other resilient mechanisms which assist in the return movements of levers 22 and 32.

It should be clearly understood that the displacement of hollow screw 25 by the motor 40 may be effected by other types of motor placements. In other words, the motor may be offset from the cable instead of coaxial therewith as illustrated in FIG. 2, with the motor operating a suitable connection via gears and so forth in order to effect axial displacement of the hollow screw. Such a modification would provide an electrically actuated cable mechanism in accordance with the present invention while providing a motor that is merely positioned differently relative to the cable.

Electrically actuated cable mechanism 10 of the present invention provides substantial advantages over prior manually operated cable mechanisms. The cable and actuator may be totally enclosed and sealed within the housing in order to avoid the common problem of cables corroding and jamming or breaking. The device has a low cost because the total cost of a manual lever and cable mechanism exceeds that of the cost of the motor and switch for the present invention. The actuation of the parking brakes via a powered parking brake mechanism will always provide an adequate braking torque. Vehicle installation is simplified, and cable actuation by the present invention may be utilized for many other functions such as an electric hill-holding feature.

Various modifications of the above-described embodiment of the invention will be apparent to those skilled in the art. It is to be understood that such modifications can be made without departing from the scope of the invention.

I claim:

1. An electrically actuated cable mechanism, comprising a cable which extends through a housing, one end of the housing receiving a movable conduit disposed about said cable and free to move relative to said housing, the other end of the housing receiving a stationary conduit disposed about said cable, the housing containing motor means which rotates a rotatable nut disposed about a hollow screw through which extends said cable, the screw engaging said movable conduit and including a non-circular portion received within a complementary shaped opening within said housing so that the screw cannot rotate, operation of the motor means causing the nut to rotate and displace the screw so that the movable conduit is displaced relative to the housing and causes the cable, by reaction, to displace each end of the cable.

2. The electrically actuated cable device in accordance with claim 1, wherein the non-circular portion comprises an end of the hollow screw and the complementary shaped opening is defined by a housing extension.

3. The electrically actuated cable device in accordance with claim 2, wherein a boot seal is disposed between said movable conduit and housing extension.

4. The electrically actuated cable device in accordance with claim 3, wherein the stationary conduit includes a seal engaging the housing, and a clip which prevents said stationary conduit from displacement into the housing.

5. The electrically actuated cable device in accordance with claim 1, wherein the ends of the cables are each attached to respective parking parking brake mechanisms of a vehicle, and the displacement of the ends of the cable causes the parking brake mechanisms to be actuated.

6. An expandible cable mechanism, comprising a cable about which is disposed a movable conduit and a stationary conduit, hollow screw means disposed about the cable and located between the conduits, the hollow screw engaging the movable conduit and the screw prevented from rotating by housing means, and motor means for effecting axial displacement of said hollow screw, operation of said motor means causing axial displacement of said hollow screw which causes said movable conduit to be displaced relative to the housing means and causing said cable, by reaction, to be displaced along with the movable conduit and effect displacement of ends of the cable.

7. The expandible cable mechanism in accordance with claim 6, wherein the housing means includes a through opening through which extends said cable.

8. The expandible cable mechanism in accordance with claim 6, wherein the motor means drives rotatably nut means which engages the hollow screw.

9. The expandible cable mechanism in accordance with claim 6, further comprising at least one parking brake mechanism attached to a respective end of the cable, the displacement of the respective end of the cable effecting actuation of the parking brake mechanism.

10. The expandible cable mechanism in accordance with claim 6, wherein the motor means comprises an electric motor.

* * * * *